US012638906B2

(12) United States Patent
Lee et al.

(10) Patent No.: US 12,638,906 B2
(45) Date of Patent: May 26, 2026

(54) SYSTEM AND METHODS FOR HARDWARE VOTING-BASED CLOCK CONTROL

(71) Applicant: Fitbit LLC, San Francisco, CA (US)

(72) Inventors: Kang Lee, San Diego, CA (US); Lei Yu, San Diego, CA (US); Conrad Smith, San Diego, CA (US)

(73) Assignee: FITBIT, LLC, San Francisco, CA (US)

( * ) Notice: Subject to any disclaimer, the term of this patent is extended or adjusted under 35 U.S.C. 154(b) by 91 days.

(21) Appl. No.: 18/290,662

(22) PCT Filed: Jul. 19, 2021

(86) PCT No.: PCT/US2021/042210
§ 371 (c)(1),
(2) Date: Jan. 19, 2024

(87) PCT Pub. No.: WO2023/003536
PCT Pub. Date: Jan. 26, 2023

(65) Prior Publication Data
US 2024/0338066 A1 Oct. 10, 2024

(51) Int. Cl.
*G06F 1/3237* (2019.01)
*G06F 1/04* (2006.01)
(Continued)

(52) U.S. Cl.
CPC .............. *G06F 1/3237* (2013.01); *G06F 1/04* (2013.01); *G06F 1/10* (2013.01); *G06F 1/3287* (2013.01)

(58) Field of Classification Search
CPC ........ G06F 1/3237; G06F 1/3287; G06F 1/04; G06F 1/10
(Continued)

(56) References Cited

U.S. PATENT DOCUMENTS 6,920,572 B2 7/2005 Nguyen et al.
8,205,017 B2 6/2012 Parr et al.
(Continued)

FOREIGN PATENT DOCUMENTS

EP 2290500 A1 3/2011

OTHER PUBLICATIONS

International Preliminary Report on Patentability for Application No. PCT/US2021/042210, mailed Feb. 1, 2024 8 pages.
(Continued)

*Primary Examiner* — Ji H Bae
(74) *Attorney, Agent, or Firm* — DORITY & MANNING P.A.

(57) ABSTRACT

The present disclosure provides computer-implemented methods, systems, and devices for controlling an external shared clock in a computing system with a plurality of system on a chips (SoCs). To do so, while a first SoC is in a low power mode, the second SoC receives a wake-up input that causes the second SoC to exit a low power mode. The second SoC asserts a clock request signal line to activate an external shared clock. The clock control system determines a state associated with the external shared clock, wherein the external shared clock is external to the first SoC. The clock control system, in accordance with a determination that the external shared clock is in an off state, transmits a signal to the external shared clock to cause the external shared clock to enter a startup state and begin producing a shared clock signal.

12 Claims, 5 Drawing Sheets

(51)  Int. Cl.
    *G06F 1/10*         (2006.01)
    *G06F 1/3287*     (2019.01)

(58)  Field of Classification Search
    USPC ........................................ 713/322, 500, 601
    See application file for complete search history.

(56)                 References Cited

U.S. PATENT DOCUMENTS

| | | |
|---|---|---|
| 9,081,517 B2 | 7/2015 | Koniaris et al. |
| 9,612,611 B1 * | 4/2017 | Nakibly .................... G06F 1/04 |
| 9,811,111 B2 | 11/2017 | Jouin et al. |
| 11,112,855 B1 * | 9/2021 | Kuo ...................... G06F 1/3296 |
| 2006/0136643 A1 * | 6/2006 | Lin ........................... G06F 1/12 |
| | | 713/400 |
| 2009/0259862 A1 | 10/2009 | Bulusu et al. |
| 2015/0193357 A1 | 7/2015 | Venas et al. |
| 2017/0212567 A1 * | 7/2017 | Jeon ......................... G06F 1/10 |
| 2017/0212576 A1 * | 7/2017 | Lee ...................... H04L 49/109 |
| 2018/0181372 A1 | 6/2018 | Moon |
| 2019/0041936 A1 | 2/2019 | Teoh et al. |
| 2019/0278357 A1 | 9/2019 | Lee et al. |
| 2019/0317911 A1 * | 10/2019 | Chun ................... G06F 1/3237 |

OTHER PUBLICATIONS

International Search Report for PCT/US2021/042210, mailed on Apr. 8, 2022, 5 pages.

* cited by examiner

400

408

402

404

406

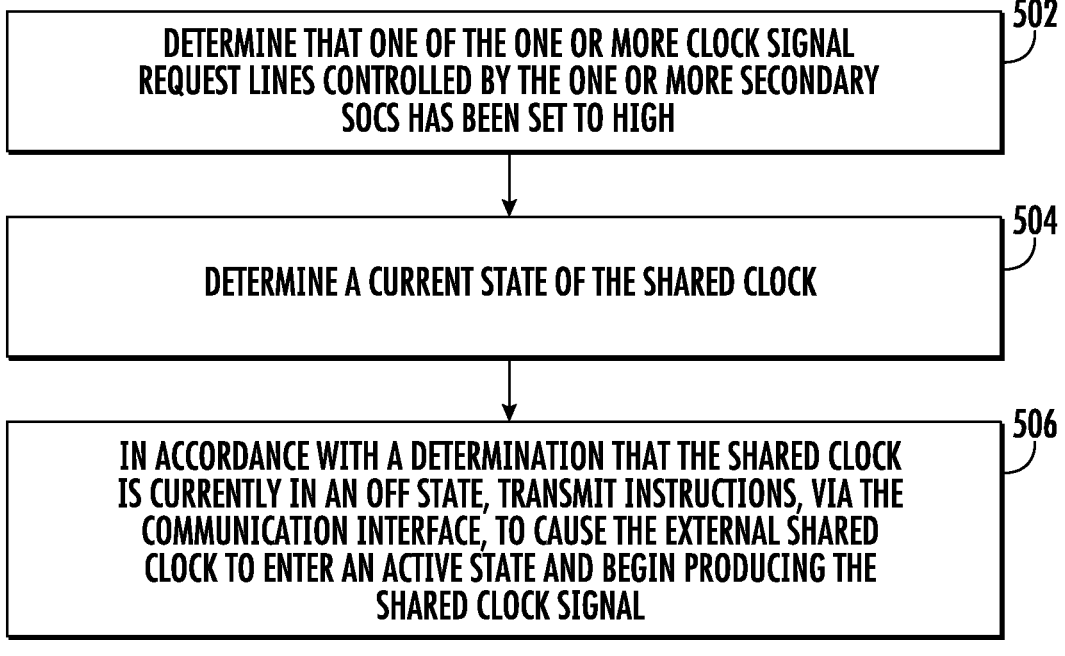

DETERMINE THAT ONE OF THE ONE OR MORE CLOCK SIGNAL REQUEST LINES CONTROLLED BY THE ONE OR MORE SECONDARY SOCS HAS BEEN SET TO HIGH ⌐502

DETERMINE A CURRENT STATE OF THE SHARED CLOCK ⌐504

IN ACCORDANCE WITH A DETERMINATION THAT THE SHARED CLOCK IS CURRENTLY IN AN OFF STATE, TRANSMIT INSTRUCTIONS, VIA THE COMMUNICATION INTERFACE, TO CAUSE THE EXTERNAL SHARED CLOCK TO ENTER AN ACTIVE STATE AND BEGIN PRODUCING THE SHARED CLOCK SIGNAL ⌐506

FIG. 5

SYSTEM AND METHODS FOR HARDWARE VOTING-BASED CLOCK CONTROL

PRIORITY CLAIM

This application is based upon and claims the right of priority under 35 U.S.C. § 371 to International Application No. PCT/US2021/042210 filed on Jul. 19, 2021, which is incorporated by reference herein.

FIELD

The present disclosure relates generally to control systems for shared clocks.

BACKGROUND

User computing devices have increased in processing power and utility. As the processing power and utility have increased, the important of battery life has increased. Thus, measures that reduce power usage and extend the life of a batter increase the usefulness of the user computing device.

SUMMARY

Aspects and advantages of embodiments of the present disclosure will be set forth in part in the following description, or may be learned from the description, or may be learned through practice of the embodiments.

[This section to be filled in by counsel when claims are finalized].

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing external shared clocks in systems with more than one SoC.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which:

FIG. 5 is a flowchart depicting an example process of providing efficient control of an external shared clock in accordance with example embodiments of the present disclosure.

DETAILED DESCRIPTION

Figure 1:
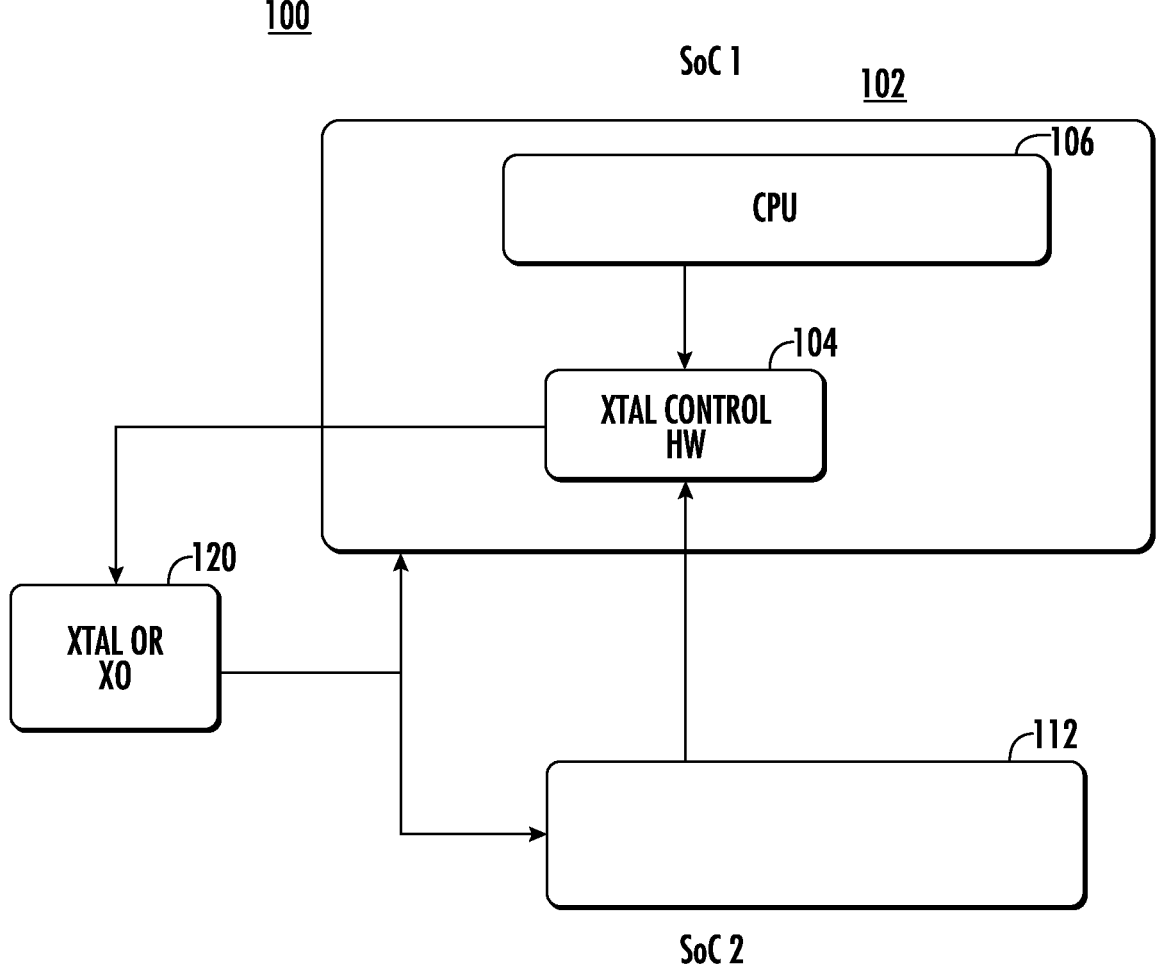
FIG. 1 illustrates an example computing system with two SoCs in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed towards enabling clock control of an external shared clock with a hardware-based voting system. In some examples, a computing system can include more than one system on a chip (SoC). For example, a computing system can include a first SoC and one or more second SoCs. The first SoC and the one or more second SoCs may rely on an external shared clock (e.g., a clock that is not incorporated into any of the SoCs) that generates a clock signal and distributes the clock signal to the first SoC and the one or more second SoCs. The first SoC can include a clock control system that enables the first SoC to control the state of the clock (e.g., turn it on and off). To save power, the first SoC can, using the clock control system, turn off the external shared clock when it is not needed by any connected SoC (e.g., when the connected SoCs are in a low power or sleep mode). The external shared clock can be turned back on when requested by the first SoC or the one or more second SoCs.

In traditional systems, if a second SoC needs to turn on the external shared clock, it is necessary to wake up the processor on the first SoC and request that the processor directs the clock control system to turn on the external shared clock. This causes the processor associated with the first SoC to exit the low power mode or sleep mode and results in additional power consumption. To solve this problem, the first SoC can be manufactured such that the clock control system has one or more input pins (e.g., I/O pins) that connect to the one or more second SoCs directly via a clock request signal line that is controlled by one of the second SoCs. The clock request signal line can be used by the second SoC to assert the associated input pin at the clock control system within the first SoC without interacting with any other component of the first SoC. Thus, a second SoC can directly request that the external shared clock be turned on by setting the clock request signal line to a predetermined high voltage (e.g., a voltage associated with logical high). The processor of the first SoC does not need to be woken up. As a result, the system disclosed herein can result in significant power savings. When the second SoC no longer requires the external shared clock, the second SoC can stop asserting the clock request signal line and, in response, the clock control system can direct the external shared clock to turn off (e.g., stop producing the shared clock signal).

A specific example can include a wearable computing device (e.g., a smartwatch or fitness band) that a user wears throughout the day. The wearable computing device can include, among other components, a first SoC, one or more second SoCs, and an external shared clock. The first SoC and the one or more second SoCs can be in a low power mode (e.g., a sleep mode) and as a result, the external shared clock can be off Due to input from a user or other stimuli, one of the second SoCs can be woken up and require the shared clock signal. The second SoC does not have control of the external shared clock and so is unable to turn on the external shared clock by itself.

To turn the external shared clock on, the second SoC can assert a pin at the clock control system by setting the voltage associated with a clock request signal line to high. For example, the voltage of the clock request signal line can be set to 5 volts, 3.3 volts, or another voltage value associated with a logical high in that system. When the voltage of the clock request signal line is set to high, the associated pin of the clock control system is asserted. Thus, in this disclosure asserting the pin of the clock control system and setting the clock request signal line to high are used interchangeably depending on whether the discussion is from the perspective of the second SoC or the clock control system.

The clock request signal line can connect directly to a clock control system within the first SoC. Directly asserting a pin on the clock control system does not require waking up the processor of the first SoC, thus avoiding significant power usage. When the clock request signal line is asserted, the clock control system can turn on the external shared clock. When the second SoC no longer requires the shared clock signal (e.g., the second SoC enters a sleep mode), the second SoC can cease asserting the clock request signal line. Once the clock request signal line is no longer being asserted, the clock control system can turn off the external shared clock (as long as no other second SOCs are asserting their respective clock request signal line.)

More specifically, a computing device can include a plurality of SoCs. Specific examples of a computing system that can include multiple SoCs can be a portable computing device, such as a smartphone, a wearable computing device, a laptop, a tablet computer, and any of a variety of other embedded computing devices. In some examples, a portable computing device can use a battery to power its operations. As such, reducing power consumption by the components of the portable computing device can lengthen the battery life associated with the device and thus increase its usefulness to a user. One method for decreasing power usage is to implement a low power or sleep mode for one or more of the SOCs.

An SoC can be an integrated circuit that includes many (or all) components of a computing system. For example, an SoC can include one or more processors, memory, interfaces that can perform communication protocols, digital signal processors, and other components associated with a computing system. The disclosed multi-SoC computing system can include a first SoC that includes a clock control system responsible for controlling the state of an external shared clock.

In some examples, the multiple SoCs can include a first SoC and one or more second SOCs. The first SoC refers to the SoC that includes a clock control system that controls an external shared clock. The first SoC can also be referred to as a managing SoC or a primary SoC. The external shared clock can connect to each of the first SoC and the one or more second SOCs to provide a shared clock signal. Each of the one or more second SoCs can be associated with one or more accessories. For example, a second SoC can be associated with a Bluetooth communication system or the display associated with the device. In some examples, the one or more second SoCs can be referred to as secondary SoCs or client SoCs.

As noted above, the first SoC can include a clock control system that has the responsibility to turn the clock off when it is not being needed and to turn the clock on when required by one of the second SoCs or the first SoC. Each SoC can enter a sleep mode (or reduced power mode) that can reduce power consumption when the computing device is not being used. Thus, at any time, one or more of the SoCs can be in sleep mode. When all of the SoCs connected to an external shared clock are in sleep mode, the external shared clock can be turned off to reduce power usage.

If the first SoC is woken up (e.g., responding to input or a scheduled task), the first SoC can direct the clock control system to turn on the external shared clock. However, if one of the second SoCs is woken up, it must rely on the clock control system in the first SoC to turn on the clock. Rather than requiring the second SoC to communicate with the processor of the first SoC (and wake the processor up in the process), the disclosed clock control system can include a plurality of input ports that enable the one or more second SoCs to communicate directly with the clock control system.

To communicate directly with the clock control system included in the first SoC, each second SoC can be connected to a clock request signal line which the second SoC controls. To request that the external shared clock be turned on, the second SoC can cause the input pin of the clock control system to be asserted by setting the clock request signal line to high voltage. This allows the second SoC to communicate with the clock control system to request that the external shared clock be turned on without waking up the processor of the first SoC. Similarly, when the second SoC no longer needs the shared clock signal (e.g., when it is entering sleep mode) it can set the clock request signal line to a predetermined low voltage (a voltage established as a logical low).

The external shared clock can be any type of device suitable for generating a clock signal in a computing system. For example, the external shared clock can be an electronic oscillator composed of quartz or other crystals. The clock control system included in the first SoC can be configured to, when requested, instruct the clock to start producing a shared clock signal or cease producing a shared clock signal based on the needs of the first SoC and the one or more second SOCs.

In some examples, the clock control system can include circuitry to receive requests from more than one second SoC (through more than one input pin). The circuitry can implement control logic that can handle requests from multiple different second SOC's. In some examples, this control logic can be called voting logic. The control logic (or voting logic) included in the clock control system can include systems that are able to monitor the current state of the external shared clock, determine assertion of one or more input pins, and in response to determining that one of the input pins have been asserted and determining the current state of the clock, control the external shared clock appropriately in response to the input requests.

In some examples, the state of the external shared clock can be represented using a state machine that includes at least three states. A first state can be an off state (e.g., a sleep state) in which the external shared clock is not generating a shared clock signal. The second state can be a state of initial power up in which the clock is unstable and generates a significant amount of noise. During this time, the shared signal may not be useful for the one or more connected SoCs. The third state can be a stable clock production state in which the external shared clock is producing a stable shared clock signal that can be used by the connected SoCs.

In some examples, the state machine implemented by the clock control system can be updated based on requests received from the one or more input pins associated with one or more clock request signal lines. In response to determining that a clock request signal line has been set to high, the clock control system can determine the current state of the external shared clock. Based on the current state, the clock control system can determine what the next state of the external shared clock should be. For example, if the clock control system determines that an input pin is being asserted (because a clock request signal line has been set to high) and that the clock is currently in the off state, the clock control system can cause the external shared clock to enter the clock start-up state.

If the clock control system determines that the clock system is already in the start-up state (e.g., a different second SoC has previously initiated startup of the clock), the clock control system will not change the start-up process of the clock and allow it to continue on to the third state which is the stable signal production state. Similarly, if the external shared clock is already in the stable signal production state when the input pin assertion is detected, the clock control system will leave the clock in the stable signal production state.

Similarly, if one of the pins associated with a clock signal is no longer asserted (e.g., the associated clock request signal line is set to low), the clock control system can determine, based on the current state of the external shared clock and any other input pins, the correct action to take. For example, if the line associated with a particular clock request signal line is set to low, the clock control system can determine whether the clock request signal line associated with any other second SoCs are asserted or if the first SoC has requested that the external shared clock be turned on. If so, no change will be made to the state of the external shared clock. However, if no other clock request signal lines are asserted, the clock control system can direct the external shared clock to move into the low power or off state.

The following provides an end-to-end example of the technology described herein. A computing device can include a plurality of SoCs. In some examples, the plurality of SoCs can include a first SoC and one or more second SoCs. The first SoC can include memory, one or more processors, and a clock control system that controls an external shared clock external to the first SoC. The external shared clock can provide a shared clock signal to the first SoC and the one or more second SoCs.

The control clock system can include one or more input pins connected to one or more clock request signal lines controlled by one or more second SoCs. In this way, the second SoCs can communicate directly with the control clock system without first engaging the processor (e.g., via an interrupt signal or other communication means). The control clock system can determine that one of the one or more clock request signal lines controlled by the one or more second SoCs has been set to high.

In some examples, the processor included in the first SoC can be in a low power state when the clock control signal determines that one of the one or more clock request signal lines controlled by the one more second SoCs has been set to high. The clock control system can turn the external shared clock on (e.g., put it in the start-up state) without causing the processor associated with the first SoC to leave the low power state or wake up.

In response to determining that a clock request signal line has been set to high, the clock control system can determine a current state of the external shared clock. The possible states of the external shared clock can include, but are not limited to an off state, a startup state, and a stable signal production state. The clock control system can use a state machine to track the state of the external shared clock.

In accordance with a determination that the external shared clock is currently in an off state, the clock control system can transmit instructions, via a communication interface, to cause the external shared clock to enter an active state and begin producing the shared clock signal. After transmitting the instructions, the clock control system can update the state machine to the startup state. In some examples, while in the startup state, the external shared clock can produce a higher amount of noise and consume more power.

In some examples, the clock control system can include logic that can, after a predetermined period of time from entering the start-up state, transition the stored state of the external shared clock from the start-up state to the stable signal production state.

The clock control system can determine that one of the one or more clock request signal lines controlled by the one or more second SoCs has been set to low (e.g., when the second SoC goes back into low power mode.) The clock control system can determine whether at least one of the other clock request signal lines controlled by the one or more second SoCs is currently set to high.

In response to a determination that none of the other clock request signal lines controlled by the one or more second SoCs is currently set to high, the clock control system can transmit instructions, via the communication interface, to cause the external shared clock to enter the off state and cease production of the shared clock signal. For example, the clock control system can use one or more control signal lines to provide instructions to the external shared clock.

In accordance with a determination that at least one of the other clock request signal lines controlled by the one or more second SoCs is currently set to high, the clock control system can direct the external shared clock to continue producing the shared clock signal. In some examples, directing the external shared clock to continue producing the shared clock signal can include refraining from sending additional instructions to the external shared clock.

Embodiments of the disclosed technology provide a number of technical effects and benefits, particularly in the areas of user computing devices. In particular, embodiments of the disclosed technology provide improved techniques for managing a clock shared between multiple SoCs when one of the SoCs manages the external shared clock. Specifically, by allowing the second SoCs to communicate directly with the clock control system included in the first SoC, without causing the associated processor(s) to exit low power mode (e.g., wake up), the overall power usage of the multi-SoC computing system is significantly decreased. Thus, allowing the processor(s) associated with the first SoC to stay in low-power mode can result in extended battery life for the computing system. In addition, direct communication between the one or more second SoCs can reduce the amount of time necessary to turn on the external shared clock, resulting in quicker responses by the computing device and less wasted time and power.

With reference now to the figures, example aspects of the present disclosure will be discussed in greater detail.

FIG. 1 illustrates an example computing system 100 with two SoCs in accordance with example embodiments of the present disclosure. The example computing system 100 includes a first SoC (SoC 1 102), a second SoC (SoC 2 112), and an external shared clock 120 that is external to both the first SoC 102 and the second SoC 112. The external shared clock 120 can provide a clock signal to both the first SoC 102 and the second SoC 112.

An SoC can be an integrated circuit that includes many (or all) components of a computing system. For example, an SoC can include one or more processors, memory, interfaces that can perform communication protocols, digital signal processors, and other components associated with a computing system.

The first SoC can include a processor 106 and a clock control system 104. The clock control system 104 can provide instructions to the external shared clock 120 causing it to turn on or turn off In some examples, the clock control system 104 can receive instructions from the processor 106 indicating whether the external shared clock should be turned on or off.

The processor 106 can include one or more of: one or more processor cores, a microprocessor, an ASIC, a FPGA, a controller, a microcontroller, etc. The one or more processors can be one processor or a plurality of processors that are operatively connected. The memory can include one or more non-transitory computer-readable storage mediums, such as RAM, ROM, EEPROM, EPROM, flash memory devices, etc., and combinations thereof.

The clock control system 104 can include a plurality of input pins that are connected directly to a second SoC 112 (and any other SoCs in the system not pictured). The connection between the second SoC (SoC 2 112) and the input pin can be a clock request signal line 114 that is controlled by the second SoC 112.

Each SoC can enter a sleep (or low-power) state. While in the sleep state, the SoCs may not need the shared clock signal. Thus, if the first SoC 102 and the second SoC 112 are both in sleep mode (or are going to enter sleep mode), the clock control system 104, can direct the external shared clock 120 to enter an off state.

When the second SoC 112 wakes up (e.g., in response input or a scheduled task), the second SoC 112 can avoid waking up the processor 106 of the first SoC 102 by setting the clock request signal line 114 to high (e.g., 5V, 3.3V, or another voltage that represents logical high in this system). Setting the clock request signal line 114 to high asserts the input pin associated with the clock control system 104.

The clock control system 104 can include logic that enables a voting algorithm and controls a state machine. In response to one of the input pins being asserted, the clock control system 104 can determine a current state of the external shared clock 120. The state of the external shared clock can be represented using a state machine that includes at least three states. A first state can be an off state (e.g., a sleep state) in which the external shared clock 120 is not generating an external shared clock signal. The second state can be a state of initial power up in which the external shared clock 120 is unstable and thus the signal it generates includes a significant amount of noise. During this time, the external shared clock signal may not be useful for the one or more SoCs. The third state can be a stable clock production state in which the external shared clock 120 is producing a stable shared clock signal and it can be used by the connected SoCs.

Thus, when the clock control system 104 determines that an input pin has been asserted, the clock control system can determine the state associated with the external shared clock 120. If the state of the external shared clock 120 is the off state, the clock control system 104 can direct the external shared clock 120, via a communication line, to enter a start-up state.

If the clock control system 104 determines that the external shared clock 120 is either in the start-up state or the stable clock production state, the clock control system 104 can allow the external shared clock 120 to continue without interruption. In this way, the clock control system 104 can ensure that if any of the SoCs that receive the shared clock signal generated by the external shared clock 120 requires the shared signal, the external shared clock 120 will produce the signal. As such, if the first SoC 102 or the second SoC 112 (or any other second SoCs not pictured) request the shared clock signal, the clock control system 104 can ensure it is produced by controlling the state of the external shared clock 120.

Similarly, when the second SoC 112 no longer requires the shared clock signal, the second SoC 112 can set the clock request signal line to low (either by forcing it to low or allowing it to float freely to low depending on the design of the system). Setting the clock request signal line to low can de-assert the input pin included in the clock control system 104.

In response to determining that the input pin is no longer asserted, the clock control system 104 can determine both the current state of the external shared clock 120 and whether any other input pins are asserted. If the external shared clock 120 is in the start-up state or the stable clock production state, and the clock control system 104 determines that no other input pins are asserted and the processor 106 of the first SoC 102 has not requested the shared clock signal (e.g., request that the external shared clock 120 be turned on), the clock control system 104 can direct the external shared clock 120 to enter the off state. If the external shared clock 120 is already in the off state, the clock control system 104 can take no action, allowing the external shared clock 120 to stay in the off state.

The external shared clock 120 can be any type of device suitable for generating a clock signal in a computing system. For example, the external shared clock 120 can be an electronic oscillator including quartz or other crystals. The clock control system 104 included in the first SoC 102 can be configured to, when requested, instruct the external shared clock 120 to start producing a shared clock signal or cease producing a shared clock signal based on the needs of the first SoC 102 and the one or more second SOCs 112.

Figure 2:
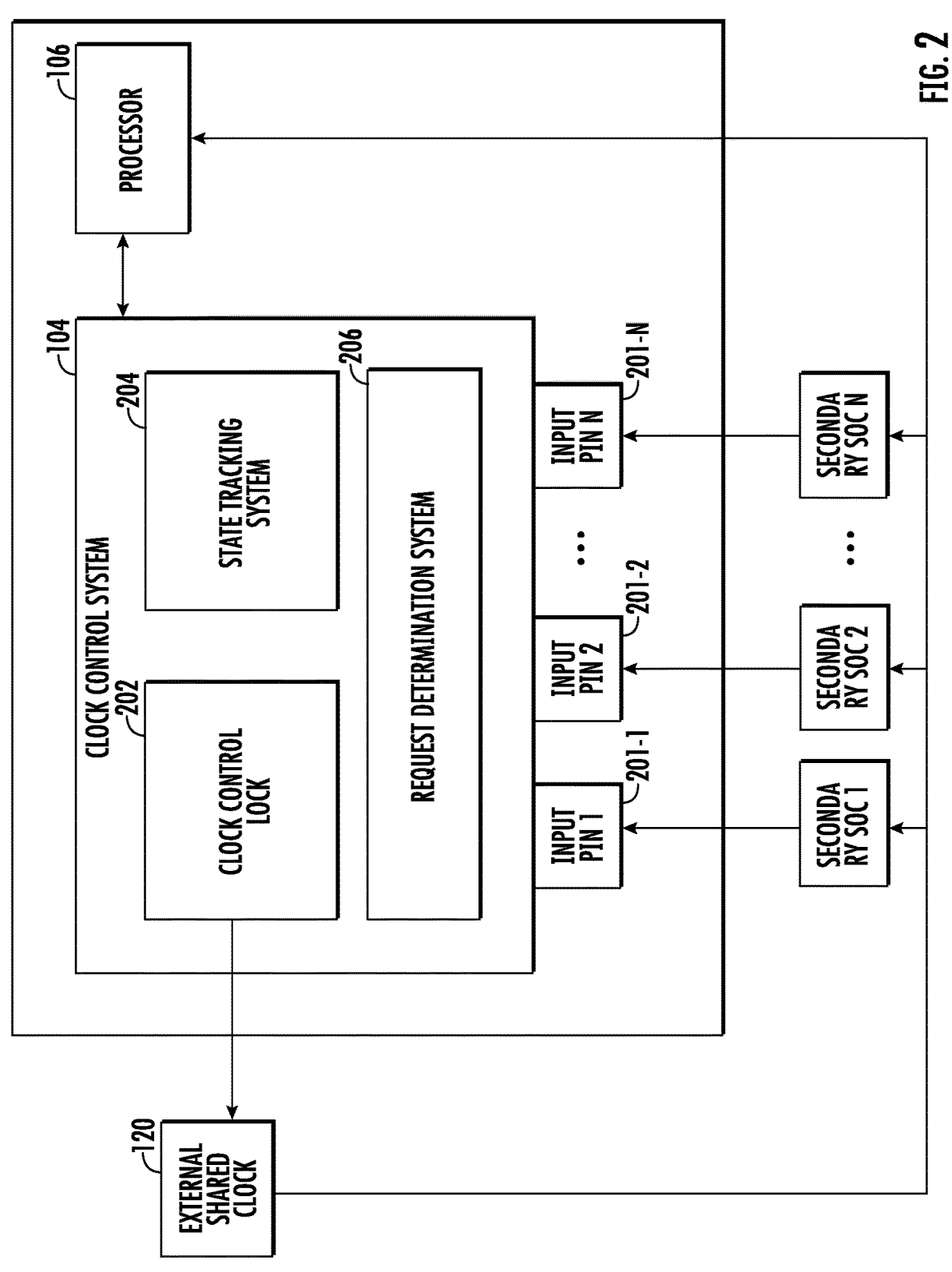
FIG. 2 illustrates an example clock control system in accordance with example embodiments of the present disclosure.

FIG. 2 illustrates an example clock control system 104 in accordance with example embodiments of the present disclosure. In this example, the clock control system 104 is included within a first SoC 102. The clock control system 104 can be connected to a processor 106 within the first SoC 102, an external shared clock 120, and a plurality of second SOCs (e.g., 112-1 to 112-N). The clock control system 104 can include clock control logic, 202, a state tracking system 204, and request determination system 206. The clock control system 104 can also include a plurality of input pins (201-1 to 201-N) that connect to the plurality of second SoCs.

The clock control system can receive instructions from the processor 106. The processor can determine when the first SoC 102 requires the shared clock signal as well as other functions of the first SoC 102. This information can be communicated to the clock control system 104.

The external shared clock 120 can, when in the stable signal production state, provide the signal to the first SoC 102 and a plurality of second SoCs 112-1 to 102-N. The request determination system 206 can determine, for each input pin (e.g., input pin 1 201-1, input pin 2 201-2, and input pin N 201-N), whether the pin is asserted or not. In some examples, the request determination system 206 can determine when the input pin becomes asserted or any previously asserted pen ceases to be asserted. The request determination system 206 can notify the clock control logic 202 when any of the pins become asserted or unasserted.

The clock control logic 202 can, when a pin becomes asserted, access the state tracking system 204 to a folder to determine the current state of the external shared clock 120. The external shared clock 120 can include three or more states. A first state can be an off state (e.g., a sleep state) in which the external shared clock is not generating a shared clock signal. The second state can be a state of initial power up in which the clock is unstable and generates a significant amount of noise. During this time, the shared signal may not be useful for the one or more SoCs. The third state can be a stable clock production state in which the external shared clock 120 is producing a stable shared clock signal and it can be used by the connected SoCs.

Once the clock control logic 202 determines the state, the clock control logic 202 can determine what the next state of the external shared clock 120 should be. For example, if the clock control logic 202 determines that the input pin (e.g., input pin 1 201-1, input pin 2 201-2, and input pin N 201-N) is being asserted (because a clock request signal line has been set to high) and that the external shared clock 120 is currently in the off state, the clock control logic 202 can cause the external shared clock 120 to enter the clock start-up state.

If the clock control system 104 determines that the external shared clock 120 is already in the startup state (e.g., a different second SoC has previously initiated startup of the external shared clock 120), the clock control logic 202 will not change the startup process of the clock and allow it to continue to the third state which is the stable signal production state. Similarly, if the external shared clock 120 is already in the stable signal production state, the clock control system 104 can leave the clock in the stable signal production state.

Similarly, if one of the pins (e.g., input pin 1 201-1, input pin 2 201-2, and input pin N 201-N) associated with a clock signal is no longer asserted (e.g., the associated clock request signal line is set to low), the clock control logic 202 can determine, based on the current state of the external shared clock and any other input pins, the correct action to take. For example, if the line associated with a particular clock request signal line is set to low, the clock control logic 202 can determine whether the clock request signal line associated with any other second SoCs are asserted. If so, no change will be made to the state of the external shared clock 120. However, if no other signal request lines are asserted, the clock control logic 202 can direct the external shared clock to move into the low power or off state.

The clock control logic 202 can, using the state tracking system 204, update the state of the external shared clock 120. For example, if the clock control logic 202 instructs the external shared clock 120 to go from the off-state to the start-up state, the state tracking system 204 can update the state of the external shared clock 120 to the start-up state. The external shared clock 120 can automatically transition from the startup state to the stable signal production state. As such, the state tracking system 204 can automatically transition the stored state associated with external shared clock 120 from the start-up state to the stable signal production state after a predetermined time.

In some examples, the state machine implemented by the clock control system can be updated based on requests received from the one or more input pins associated with one or more clock request signal lines. In response to determining that a clock request signal line has been set to high, the clock control system can determine the current state of the external shared clock.

Figure 3:
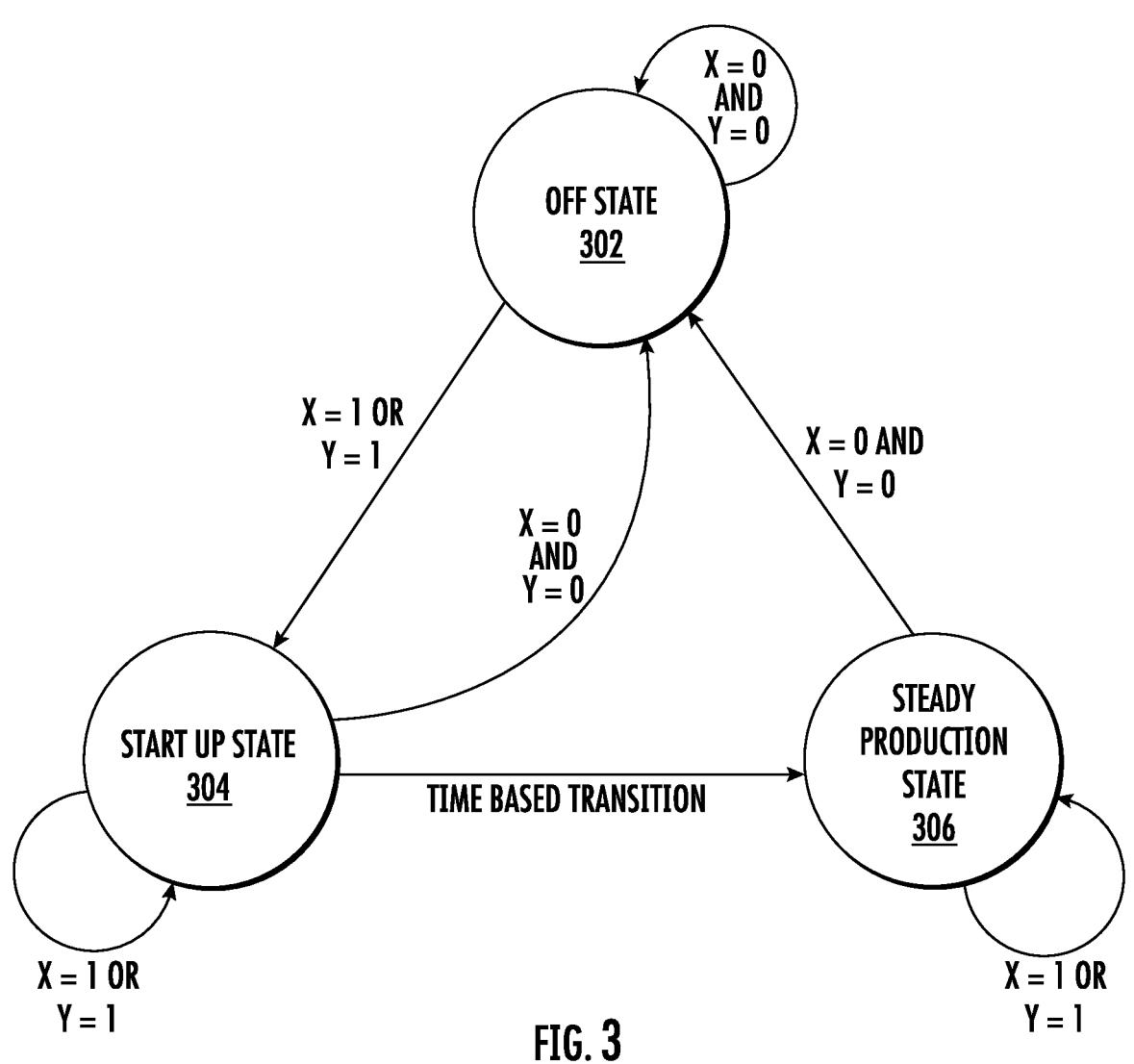
FIG. 3 illustrates an example state machine in accordance with example embodiments of the present disclosure.

FIG. 3 illustrates an example state machine in accordance with example embodiments of the present disclosure. In this state machine, the states can include an off state 302, a startup state 304, and a stable signal production state 306. The inputs to this state machine are two input pins on a clock control system (e.g., clock control system 104 in FIG. 1), x and y.

The off state 302 can also be a low power state in which an external shared clock (e.g., external shared clock 120 in FIG. 1) does not produce a shared signal. While both the X input pin and the Y input pin are not asserted (e.g., logical 0), the state remains in the off state 302.

If either the x input pin or the Y input pin is asserted (e.g., their value is set to logical 1), the state of the external shared clock 120 can transition, under the control of the clock control logic 202, into the startup state 304. The startup state 304 can be a state in which the external shared clock 120 is initially noisy and does not produce a suitable shared clock signal. If either the X input pin or the Y input pin are asserted during this start-up time, the state of the external shared clock 120 can remain in the startup state 304. However, if both the x input pin and the Y input pin are de-asserted, the clock control logic 202 can transition the state back to the off state 302.

Once a predetermined time has passed (based on the amount of time it takes for the external shared clock 120 to stabilize), the state of the external shared clock 120 can transition to the stable signal production state 306. The external shared clock 120 will produce a shared clock signal consistently while in the stable signal production state 306. If either the X input pin or the Y input pin remains asserted, the clock will remain in the stable signal production state even if the other input pin is de-asserted. if both the X input pin and the Y input pin are de-asserted, the external shared clock 120 can transition, under the control of the clock control logic 202, to the off state 302.

Figure 4:
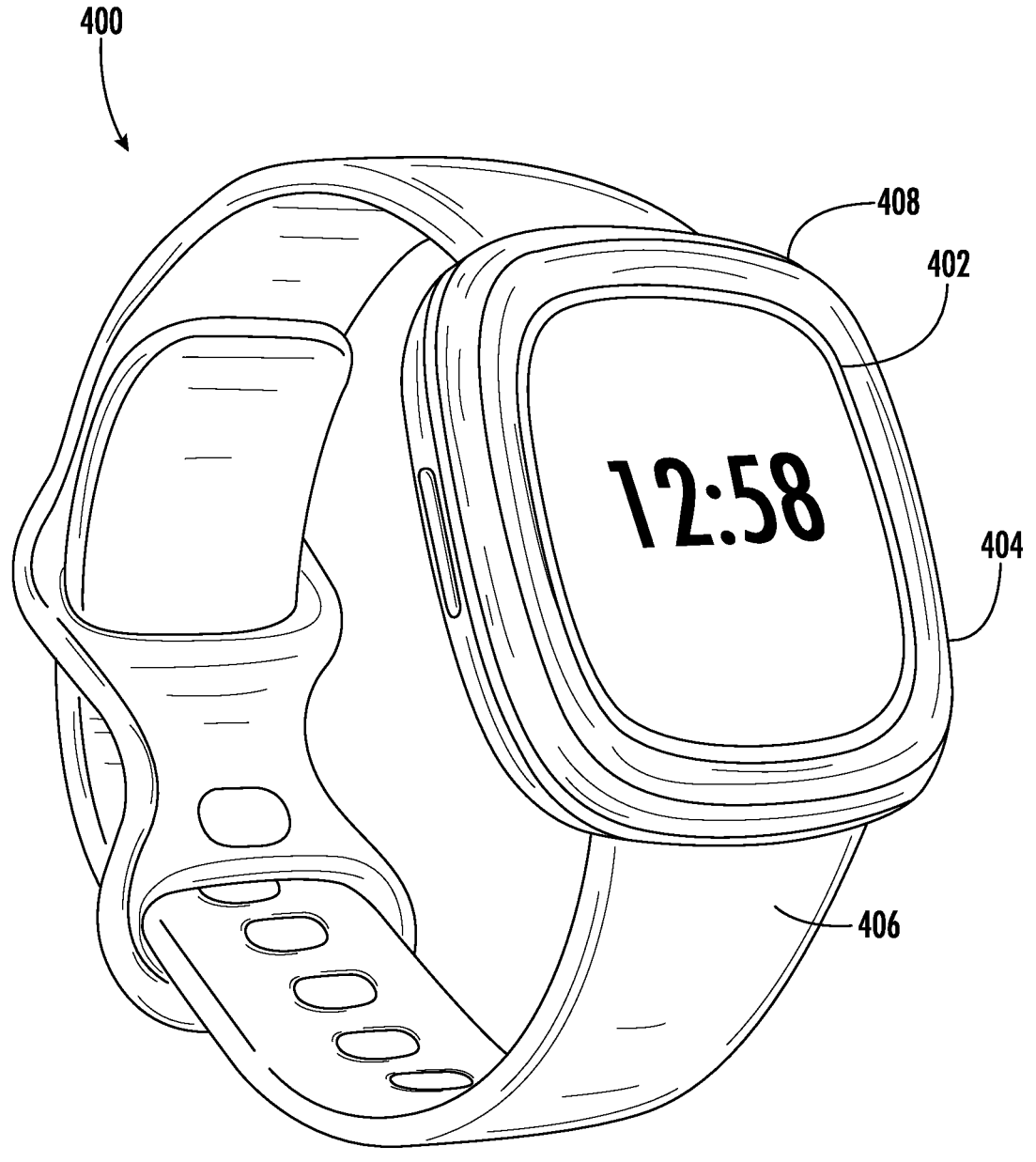
FIG. 4 illustrates an example wearable computing device in accordance with example embodiments of the present disclosure.

FIG. 4 depicts the front view of an example wearable device 400 according to example embodiments of the present disclosure. In an example embodiment, the wearable device 400 may be a wristband, a bracelet, a wristwatch, an armband, a ring placed around a digit of the user, or other wearable products that may be equipped with sensors as described in the present disclosure. In an example embodiment, the wearable device 400 is configured with a display 402, a device housing 404, a band 406, and one or more additional sensors 408. The wearable device 400 can include a plurality of SoCs including a first SoC (e.g., first SoC 102 in FIG. 1) that includes a clock control system (e.g., clock control system 104 in FIG. 1) that controls an external shared clock (e.g., external shared clock 120 in FIG. 1). The wearable device 400 can also include a plurality of second SoCs that control one or more other components of the wearable device, including, but not limited to, the display, one or more sensors, one or more communication protocol interfaces (e.g., Bluetooth or Wi-Fi), a camera system, and so on. One or more of the second SoCs can be configured to use a shared clock signal from an external shared clock 120.

FIG. 5 is a flowchart depicting an example process of controlling an external shared clock in a computing system with multiple SoCs in accordance with example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-2.

A computing device can include a plurality of SoCs. In some examples, the plurality of SoCs can include a first SoC (e.g., first SoC 102 in FIG. 1) and one or more second SoCs (e.g., second SoC 112 in FIG. 1). The first SoC 102 can include memory, one or more processors, and a clock control system (e.g., clock control system 104 in FIG. 1) that controls an external shared clock (e.g., external shared clock 120 in FIG. 1) external to the first SoC 102. The external shared clock 120 can provide a shared clock signal to the first SoC 102 and the one or more second SoCs 112.

The clock control system 104 can include one or more input pins connected to one or more clock request signal lines controlled by one or more second SoCs 112. In this way, the second SoCs 112 can communicate directly with the control clock system without first engaging the processor (e.g., via an interrupt signal or other communication means). The clock control system 104 can, at 502, determine that one of the one or more clock request signal lines controlled by the one or more second SoCs 112 has been set to high.

In some examples, the processor 106 included in the first SoC 102 can be in a low power state when the clock control system 104 determines that one of the one or more clock request signal lines controlled by the one more second SoCs 122 has been set to high. The processor 106 associated with the first SoC can remain in the low power state in response to a clock request signal line being set to high.

In response to determining that a clock request signal line has been set to high, the clock control system 104 can, at 504, determine a current state of the external shared clock 120. The possible states of the external shared clock 120 can include, but are not limited to an off state, a startup state, and a stable signal production state. The clock control system 104 can use a state machine to track the state of the external shared clock 120.

In accordance with a determination that the external shared clock 120 is currently in an off state, the clock control system 104 can, at 506, transmit instructions, via a communication interface, to cause the external shared clock 120 to enter an active state and begin producing the shared clock signal. After transmitting the instructions, the clock control system 104 can update the state machine to the startup state. In some examples, while in the startup state, the external shared clock can produce a higher amount of noise and consume more power.

In some examples, the clock control system 104 can include logic that can, after a predetermined period of time, transition the stored state of the external shared clock 120 from the start-up state to the stable signal production state.

The clock control system 104 can determine that one of the one or more clock request signal lines controlled by the one more second SoCs 112 has been set to low (e.g., when the second SoC goes back into low power mode.) The clock control system 104 can determine whether at least one of the other clock request signal lines controlled by the one or more second SoCs is currently set to high.

In response to a determination that none of the other clock request signal lines controlled by the one or more second SoCs is currently set to high, the clock control system can transmit instructions, via the communication interface, to cause the external shared clock 120 to enter the off state and cease production of the shared clock signal. For example, the clock control system 104 can use one or more control signal line(s) to provide instructions to the external shared clock 120.

In accordance with a determination that at least one of the other clock request signal lines controlled by the one or more second SoCs is currently set to high, the clock control system 104 can direct the external shared clock 120 to continue producing the shared clock signal. In some examples, directing the external shared clock 120 to continue producing the shared clock signal can include refraining from sending additional instructions to the external shared clock 120.

The technology discussed herein refers to SoCs and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A clock control system included in a first system on a chip (SoC) comprising:
   a processor,
   one or more input pins connected to one or more clock request signal lines controlled by one or more second SoCs;
       a communication interface for communicating with an external shared clock that is external to the first SoC; and
   one or more control circuits configured to:
       determine based on a state of the one or more input pins that a respective clock request signal line controlled by at least one of the one or more second SoCs has been set to a predetermined high voltage;
       determine a current state of the external shared clock; and
       in accordance with a determination that the external shared clock is currently in an off state, transmit instructions, via the communication interface, to cause the external shared clock to enter a startup state and begin producing a shared clock signal.

2. The clock control system of claim 1, wherein the processor included in the first SoC is in a low power state when the clock control system determines that the respective clock request signal line controlled by the at least one of the one or more second SoCs has been set to the predetermined high voltage and does not leave the low power state in response to the respective clock request signal line controlled by the at least one of the one or more second SoCs being set to the predetermined high voltage.

3. The clock control system of claim 1, wherein the current state of the external shared clock is one of the off state, the startup state, and a stable signal production state.

4. The clock control system of claim 3, wherein the clock control system uses a state machine to track a state of the external shared clock.

5. The clock control system of claim 3, wherein the one or more control circuits are further configured to:

after transmitting instructions, via the communication interface, to cause the external shared clock to enter the startup state and begin producing the shared clock signal, update the current state of the external shared clock to the startup state.

6. The clock control system of claim 3, wherein the one or more control circuits are further configured to, after a predetermined period of time, update the current state of the external shared clock to the stable signal production state.

7. The clock control system of claim 1, wherein the first SoC and at least two second SoCs are included within a computing device.

8. The clock control system of claim 1, wherein the one or more control circuits are further configured to:

determine that the respective clock request signal line controlled by the at least one of the one or more second SoCs has been set to a predetermined low voltage;

determine whether at least one other clock request signal line is currently set to the predetermined high voltage; and in response to a determination that no other clock request signal line is currently set to the predetermined high voltage, transmit instructions, via the communication interface, to cause the external shared clock to enter the off state and cease production of the shared clock signal.

9. The clock control system of claim 8, wherein the one or more control circuits are further configured to:

in response to a determination that the at least one other clock request signal line is currently set to the predetermined high voltage, direct the external shared clock to continue producing the shared clock signal.

10. The clock control system of claim 7, wherein the first SoC and the at least two second SoCs use the shared clock signal produced by the external shared clock.

11. The clock control system of claim 1, wherein the one or more input pins are general purpose input/output pins.

12. A method for controlling an external shared clock in a computing system with a plurality of system on a chips (SoCs), the method comprising:

while a first SoC is in a low power mode:

asserting, by a second SoC, a clock request signal line to activate the external shared clock, wherein the clock request signal line is connected to an input pin of a clock control system within the first SoC;

determining, by the clock control system, a state associated with the external shared clock, wherein the external shared clock is external to the first SoC; and in accordance with a determination that the external shared clock is in an off state, transmitting a signal to the external shared clock to cause the external shared clock to enter a startup state and begin producing a shared clock signal.

* * * * *